United States Patent [19]

Kucera

[11] 4,152,091
[45] May 1, 1979

[54] NUMERICAL CONTROLLED ROTARY CUTTING TOOL EXTENSION

[75] Inventor: Jerome J. Kucera, Orion, Ill.

[73] Assignee: The United States of America as represented by the Secretary of the Army, Washington, D.C.

[21] Appl. No.: 854,864

[22] Filed: Nov. 25, 1977

[51] Int. Cl.² .................... B23B 31/04; B23G 5/08
[52] U.S. Cl. .................... 408/146; 76/101 B; 279/1 A; 279/1 S; 279/83; 408/226
[58] Field of Search .................... 279/1 A, 1 S, 1 TS, 279/83, 102, 103; 90/11 A; 408/226, 239, 239 A, 146, 181, 185; 76/101 A, 101 B

[56] References Cited

U.S. PATENT DOCUMENTS

| | | | |
|---|---|---|---|
| 3,544,121 | 12/1970 | Mizoguchi | 279/1 S X |
| 3,557,419 | 1/1971 | Flannery | 279/83 X |
| 3,945,752 | 3/1976 | Bennett | 408/239 A X |

FOREIGN PATENT DOCUMENTS 649750  1/1951  United Kingdom ............ 279/102

*Primary Examiner*—Othell M. Simpson
*Assistant Examiner*—Z. R. Bilinsky
*Attorney, Agent, or Firm*—Nathan Edelberg; Robert O. Richardson

[57] ABSTRACT

An adjustable length rotary cutting tool extension for a numerical controlled machine to adjust the length of a resharpened or shorter tool to match the preestablished length set into the numerical controlled data program.

7 Claims, 4 Drawing Figures

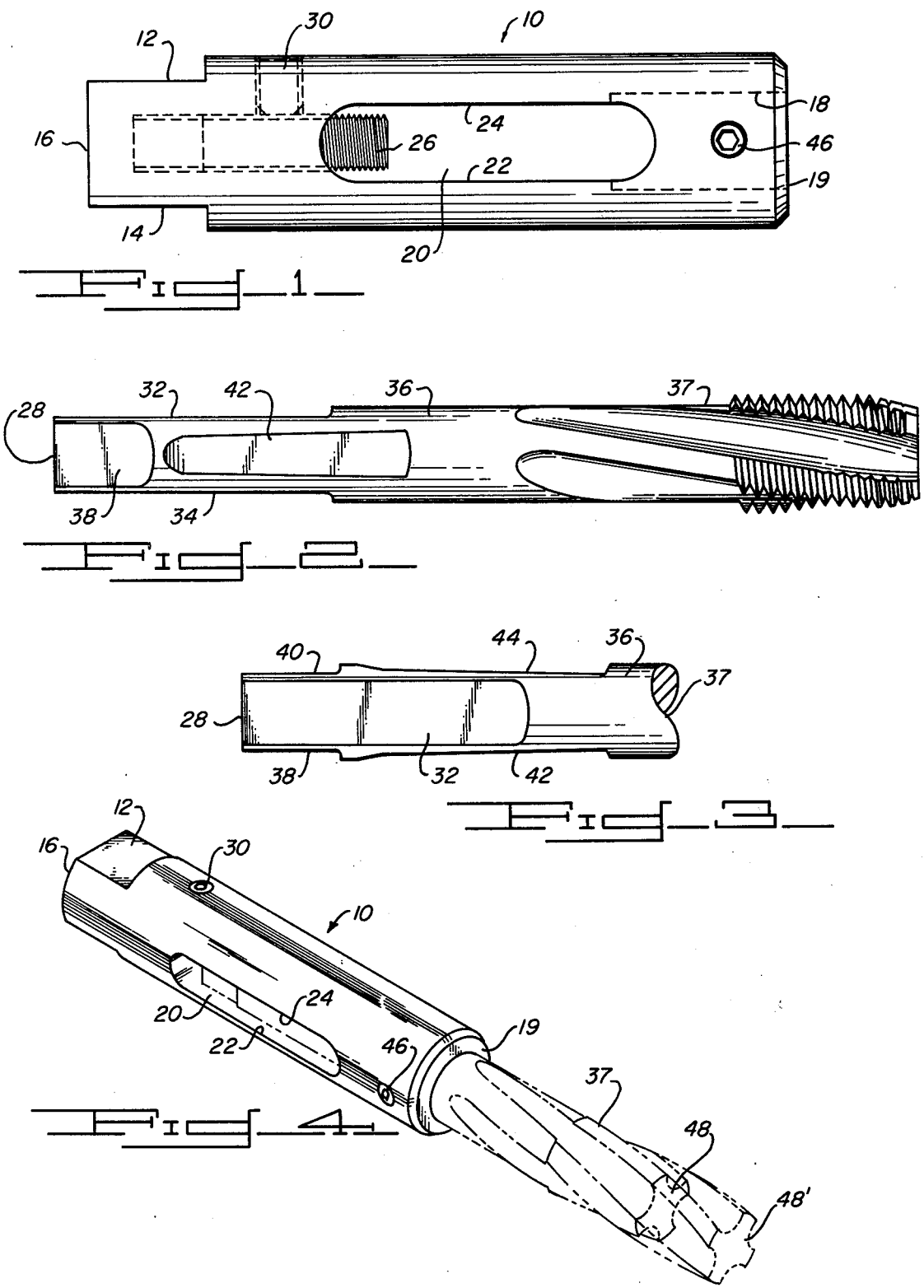

NUMERICAL CONTROLLED ROTARY CUTTING TOOL EXTENSION

GOVERNMENT RIGHTS

The invention described herein may be manufactured and/or used by or for the Government for governmental purposes without the payment of any royalty thereon.

BACKGROUND OF THE INVENTION

The present invention relates to an adjustable tap extension for use with numerical control (N.C.) manufacturing machines. The N.C. machines are complex, computer operated, machines capable of automatically performing several machining functions. Drilling, reaming, milling, tapping, etc. are a few examples of operations the machine can perform. The N.C. machine can produce finished parts from raw material automatically. The material, such as steel, is simply fastened to the machine table and the machine is started. The finished part is ready in a few minutes. This saves countless hours of machinists' time and considerable expense when mass production is involved.

The N.C. machine is controlled by a magnetic tape. Each machine function is controlled by the program recorded on the tape. It is fairly expensive and time consuming to perfect the recorded program. The machines are therefore best suited to mass production. The time and manufacturing expense saved would then offset the initial set up cost of proving the recorded program.

The present tap holders and extensions for use with N.C. machines are not adjustable for length. Therefore once the tap is dull it cannot be resharpened and reused. This is because the tap is shortened when resharpened. Since the program was recorded for the original tool length, a resharpened tap would not be compatible with the proven program. An adjustable tap extension would then be extremely desirable. This would allow the use of resharpened taps with the original program. Since the larger sized taps (over ½ inch) are fairly expensive, a significant tool savings could also be realized.

SUMMARY OF THE PRESENT INVENTION

The adjustable tool extension of the present invention is substantially cylindrical in shape. The base end is adapted to fit a standard locking collar on the N.C. machine. An axial compensating screw is also located in the base end of the tool extension. The tool rests against the screw which is adjusted to provide the correct length of the sharpened tool. The compensating screw is locked by a set screw to prevent any change in length after adjustment has been made. The tool is inserted into a central bore at the opposite end of the extension. Flat sides are ground on the shank portion of the top which abuts mating flats in the bore. This is to prevent rotation of the tool within the extension. An additional pair of flats is ground further up the shank portion of the tool. These flats are ground with a slight taper which increases the shank cross section toward the base end of the tool. The tool extension incorporates two set screws which are tightened against the tapered flats to lock the tool into the extension and against the compensating screw. The present invention provides a 500-700% increase in tool life while eliminating the need for expensive program changes. While the illustrative embodiment relates to a tap, it may also be used in drilling, grinding, polishing, or any other operation utilizing a rotating shaft which becomes shorter in length when it is restored to reusable condition.

BRIEF DESCRIPTION OF DRAWINGS

FIG. 1 is a front elevational view of the adjustable tap extension,

FIG. 2 is a front elevational view of a tap which has been modified for use with the tap extension, FIG. 3 is a partial top plan view of the modified tap and, FIG. 4 is a perspective view of the tap and adjustable tap extension assembly.

DETAILED DESCRIPTION OF ILLUSTRATIVE EMBODIMENTS

Reference is made to FIG. 1 wherein there is shown an adjustable tap extension 10 in accordance with the present invention. The tap extension is cylindrical in shape and has two flats 12, 14 ground at the base end 16 thereof. These flats 12, 14 mate with similar flats on standard tool holders on the N.C. machine to prevent rotation of the tap extension relative to the tool holder. As shown in dashed lines the tap extension 10 has a central bore 18 in its tap receiving end 19. This bore serves to receive and position the tap to be used with the adjustable extension 10. As shown, the bore 18 terminates at an opening 20 extending laterally through the mid portion of the extension. This opening has opposed parallel faces 22, 24 which engage flats 32, 34 on the tap to prevent rotational movement between the tap and the extension. The base end 16 of the tap extension is provided with an axial compensating screw 26, as shown. The compensating screw 26 extends into opening 20 to support the base end 28 of the tap (FIG. 2). The screw 26 may be adjusted as necessary to maintain the required protrusion of the resharpened tap. After adjustment has been made, the compensating screw 26 is locked in position by set screw 30.

FIGS. 2 and 3 show how standard taps are modified for use with the adjustable extension. Generally standard taps have a squared end, or four flats to facilitate use with different tool holding devices. When used with the tap extension in the present invention two opposing flats 32, 34 must be extended up the shank portion 36 of the tap 37, as shown. Flats 38, 40 are the remaining flats on the tap which have not been altered.

An additional set of flats 42, 44 are ground further up the shank portion 36 of the tap as shown in FIG. 3. These flats incorporate a slight taper which increases the shank cross section towards the base end 28. When inserted into the adjustable extension these flats 42, 44 align with a pair of set screws 46 in the extension (FIGS. 1 and 4). The set screws 46 are then tightened against the flats 42, 44 to retain the tap 37 in the extension 10. The taper insures the tap is held tightly against the compensating screw 26 when in operation.

FIG. 4 illustrates the tap and adjustable extension assembly. The tap 37 is shown in phantom lines to illustrate the difference in lengths of a new tap and one that has been sharpened. Although the tip 48 of the tap 37 appears in a different longitudinal position relative to the extension 10, this is for illustrative purposes only. In practice the compensating screw 26 would be utilized to position the tap so that the tip 48 of the resharpened tap is in the same longitudinal position, relative to the extension, as the tip 48 of a new tap. In this manner a tap may be resharpened several times without the need for modification of the recorded program.

While the foregoing description relates to a tap that has been shortened in length when it was reconditioned for subsequent use, it is obvious that the present invention may be used on other types of tools wherein their rotary shafts are also shortened in length as they are reconditioned.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. An adjustable tool extension in combination with a rotatable cutting tool having a length shorter than a pre-established length set into a numerical controlled data program used therewith, said tool extension having a base end portion, a midportion and a tool receiving end portion, said base end portion having means thereon to prevent rotation of said tool extension relative to a tool holder to be used therewith, a central bore at said tool receiving end portion of said extension to receive and position said rotatable cutting tool to be used with said extension, an opening extending laterally through said midportion of said extension, said bore terminating in said opening, said cutting tool having flats thereon to prevent rotational movement between said tool and said extension, said opening having opposed parallel faces engagable with said flats, said base end portion having an axial compensating screw therein extending into said opening to engage and limit protrusion of the shank of said cutting tool therein, said screw being rotatable in said base end portion to adjust the total length of said extension and said cutting tool to said preestablished length.

2. The combination as set forth in claim 1 wherein said means on said base end portion consists of flats engagable with said tool holder.

3. The combination as set forth in claim 1 wherein said cutting tool has a second set of flats thereon, and
    set screws on said extension engagable with said second set of flats to retain the end of said cutting tool in abuttment with said compensating screw.

4. The combination as set forth in claim 3 wherein said second set of flats have a slight taper to increase the shank cross section toward said base end.

5. The combination as set forth in claim 1 wherein said extension has a locking screw therein for locking said compensating screw after adjustment has been made.

6. A method of making resharpened rotary cutting tools in numerical controlled machines comprising the steps of:
    a. sharpening a rotary cutting tool needing such sharpening,
    b. extending the effective length of said cutting tool by placing an extension between said cutting tool and the machine with which it was used before sharpening, said extension having a bore to receive the shank of said tool, said extension having an axial adjustment thereon,
    c. making said tool non-rotatable relative to said extension by providing said tool with flats on the shank thereof, making an elongated opening laterally through said extension to provide opposed parallel faces engageable with said flats when said tool is inserted axially into the bore of said extension, and
    d. adjusting said axial adjustment until the total length of said extension and said sharpened tool is the same length as that of said sharpened tool before it was sharpened.

7. A method of using resharpened rotary cutting tools as in claim 6 wherein said axial adjustment is an axial adjustment screw against which said sharpened cutting tool abuts, and wherein said adjusting step comprises rotating said screw to achieve the desired effective length.

* * * * *

UNITED STATES PATENT AND TRADEMARK OFFICE
CERTIFICATE OF CORRECTION

PATENT NO. : 4,152,091

DATED : May 1, 1979

INVENTOR(S) : Jerome J. Kucera

It is certified that error appears in the above–identified patent and that said Letters Patent are hereby corrected as shown below:

On the title page, item [73] should be deleted in its entirety.

Signed and Sealed this

Eighteenth Day of September 1979

[SEAL]

Attest:

LUTRELLE F. PARKER

Attesting Officer          Acting Commissioner of Patents and Trademarks